United States Patent [19]
Stimson et al.

[11] Patent Number: 6,134,002
[45] Date of Patent: Oct. 17, 2000

[54] APPARATUS AND METHOD FOR THE RAPID SPECTRAL RESOLUTION OF CONFOCAL IMAGES

[75] Inventors: Michael J. Stimson; John D. Simon, both of Durham, N.C.

[73] Assignee: Duke University, Durham, N.C.

[21] Appl. No.: 09/229,874

[22] Filed: Jan. 14, 1999

[51] Int. Cl.[7] .................................. G01J 3/28; G01J 3/30
[52] U.S. Cl. .......................... 356/326; 356/318; 356/346; 359/368; 250/458.1; 250/459.1
[58] Field of Search .................................. 356/326, 346, 356/318, 319, 72; 359/368; 250/458.1, 459.1, 461.1, 235

[56] References Cited

U.S. PATENT DOCUMENTS

| | | | |
|---|---|---|---|
| 5,532,873 | 7/1996 | Dixon | 359/388 |
| 5,674,743 | 10/1997 | Ulmer . | |
| 5,822,061 | 10/1998 | Delhave et al. . | |
| 5,886,784 | 3/1999 | Engelhardt | 356/326 |
| 5,903,688 | 5/1999 | Engelhardt et al. | 385/31 |
| 6,028,306 | 2/2000 | Hayashi | 250/235 |

OTHER PUBLICATIONS

A. Feofanov et al., "A new confocal stigmatic spectrometer for micro–Raman and microfluorescence spectral imaging analysis: Design and applications," American Institute of Physics, vol. 66 (No. 5), p. 3146–3158, 1995.

*Primary Examiner*—Frank G. Font
*Assistant Examiner*—Layla Lauchman
*Attorney, Agent, or Firm*—Olive & Olive, P.A.

[57] ABSTRACT

A confocal scanning microscope apparatus and method is used to rapidly acquire spectrally resolved images. The confocal scanning microscope apparatus includes optics used to simultaneously acquire at least two points along a scan pattern on a sample plane of a sample, wherein the points include regions of the sample represented by at least two pixels. A detection arm is placed in the path of the light reflected, scattered, or emitted from the sample plane comprising a spectrometer having a slit for receiving such light and a detector array placed behind the spectrometer. The image corresponding to the at least two points is recorded on the first axis of said detector and the spectral resolution thereof is simultaneously recorded on the second axis of said detector. The confocal scanning microscope apparatus and method offers significant improvements to the current techniques for genetic sequencing, as well as significant improvements to traditional confocal scanning microscope applications.

39 Claims, 8 Drawing Sheets

APPARATUS AND METHOD FOR THE RAPID SPECTRAL RESOLUTION OF CONFOCAL IMAGES

This invention was made with partial Government support under Federal Grant No. N00014-97-1-0751 awarded by the Office of Naval Research. The Government has certain rights in this invention.

BACKGROUND OF THE INVENTION

1. Field of the Invention

The present invention relates to a new confocal scanning beam microscope and method for spectrally resolving a confocal image in a significantly short time.

2. Background of the Prior Art

The past decade has seen confocal microscopy emerge as a common tool in many areas of basic and applied science. A confocal microscope sequentially illuminates spots or locations of a sample that are confocal to a pinhole. By scanning the sample, typically in a raster pattern, a complete image is formed. Its main benefit over traditional light microscopy is the capability to resolve a two-dimensional slice (hereinafter referred to as the "sample plane") of a three-dimensional structure without the need to physically section the sample under investigation. A basic point scanning confocal microscope is disclosed by U.S. Pat. No. 3,013,467 of Minsky, which is hereby incorporated herein by reference.

Confocal microscopy has been applied principally in biological and medical sciences. Simultaneous labeling of biological materials by specific fluorescent dyes has become a common tool for locating these materials within tissues and cells. Multiple dyes are often employed, each labeling a distinct molecule or cellular region. This class of application has required fairly sophisticated multichannel detection techniques in which each channel is made sensitive to the presence of each different dye by means of filtering. Detection of fluorescence from these dyes is usually accomplished using as many photomultiplier tubes (PMTs) as dyes. The fluorescence from the sample (the signal) is split and the resulting split signals are filtered and detected. This method frequently suffers from "cross talk": the fluorescence from one dye label overlaps spectrally with that of another, thus reducing the ability to distinguish between separately labeled regions. Furthermore, autofluorescence, the native fluorescence of the sample in the absence of dye labels, often reduces the image contrast.

An alternate approach is to spectrally resolve each pixel of the confocal image, which allows even dyes with very similar spectra to be distinguished from one another and from the autofluorescent background. This approach offers the possibility of detailed exploration of light emitting microscopic environments by analysis of the position and bandwidth of particular materials in a spectrally resolved sample. Besides basic research applications, this detection technique may be applied to medical diagnosis. For example, spectroscopic differences have been observed between healthy and cancerous tissue, and these differences can be detected by spectrally resolved imaging techniques. One significant disadvantage of current confocal microscopes when used to obtain spectrally resolved images of tissue samples, for example, is that the time it takes to produce the spectrally resolved image (referred to hereinafter as "acquisition time") is prohibitively long.

Figure 1:
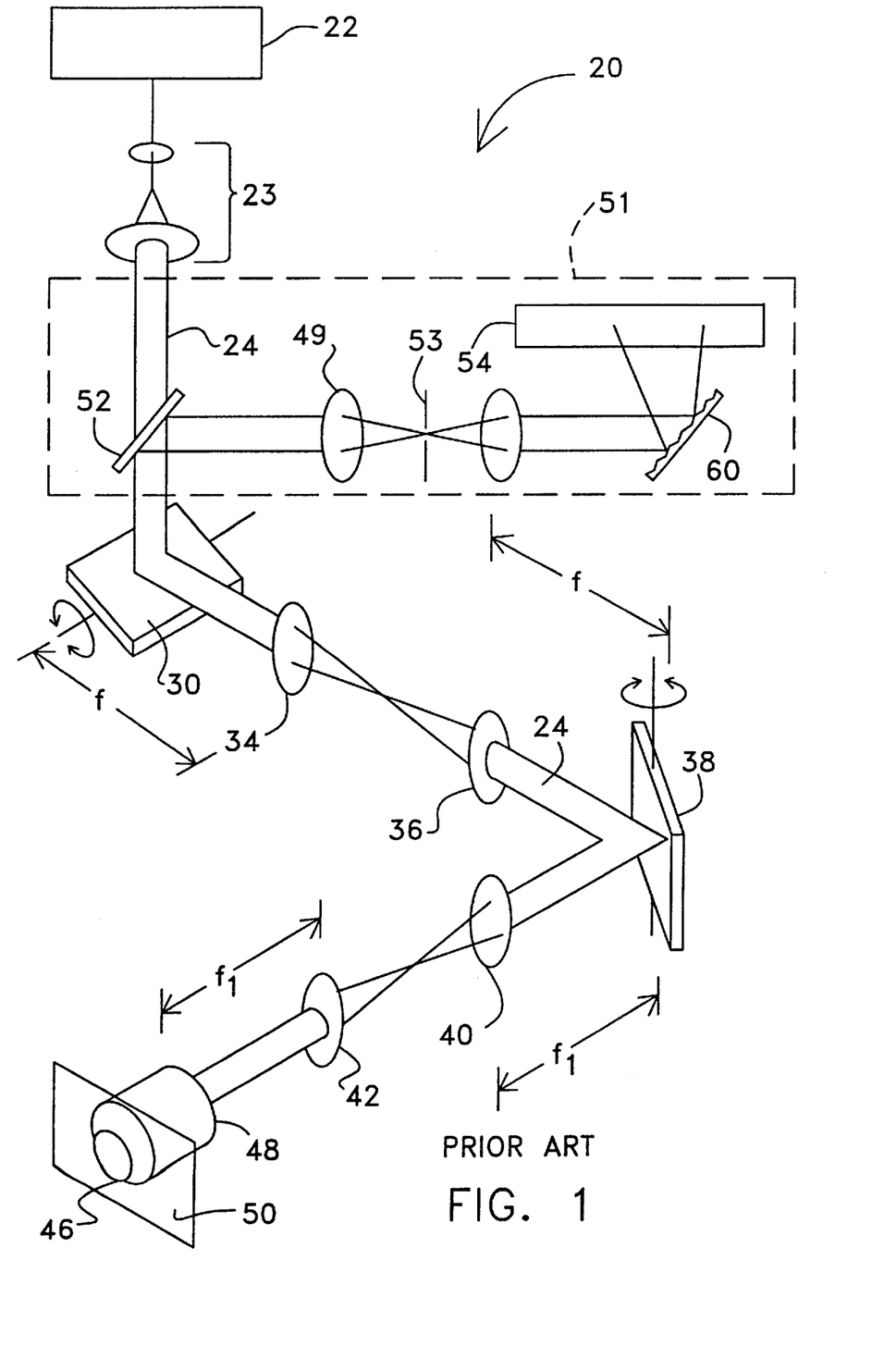
FIG. 1 is a schematic diagram of a standard point-focused, scanning confocal microscope fully descanned spectrally resolved detection of the prior art.

FIG. 1 illustrates the basic components of a typical prior art confocal microscope 20 and having added thereto spectral dispersion device 60. Confocal microscope 20 includes laser 22 that emits a collimated light beam 24 that is expanded by beam expander 23. Light beam 24 is projected onto first scan mirror 30. First scan mirror 30, in this example, is driven to oscillate between two angles by computer control of voltages applied to first scan mirror 30, causing light beam 24 to be scanned vertically, along the y axis. Intermediate placed lenses 34, 36, having focal length f, form a unitary telescope that directs vertically scanned light beam 24 onto second scan mirror 38, which scans beam 24 horizontally to form a light beam moving in a raster pattern. As with first scan mirror 30, second scan mirror 38 is driven to oscillate between two angles by computer control of voltages applied to second scan mirror 38. A raster refers to a scan pattern in which the sample is scanned by the laser beam from side to side in horizontal lines and from top to bottom. In FIG. 1, scan mirror 30 (the Y-axis scan mirror) is set to oscillate much slower than second scan mirror 38 (the X-axis scan mirror). The resulting raster beam moves fast horizontally and slow vertically, and is relayed by a second set of intermediate lenses 40, 42, each having focal length f and forming a second unitary telescope. This arrangement directs the recollimated beam to the entrance aperture 48 of microscope objective 46, such that the angle of light beam hitting aperture 48 varies over time, thereby continuously scanning the sample plane 50 in a tightly focused raster pattern. The light, emitted, reflected, or scattered from the sample (the signal beam) retraces the path of the excitation beam through the microscope objective 46, scan mirrors 38, 30 and intermediate optics 42, 40, 36, and 34. On the retrace path, the signal beam is partially descanned by second scan mirror 38 (horizontal motion is removed) and then fully descanned by first scan mirror 30 (vertical motion is removed). The collimated and fully descanned signal beam from sample plane 50 is then reflected by a dichroic beamsplitter 52 of detection arm 51 of confocal microscope 20, and focused by lens 49 through pinhole 53 that rejects the light emitted, reflected, or scattered from that part of the sample not in the plane of focus of the objective, and passes light to detector 54 only from that part of the sample that is in the plane of focus, i.e. sample plane 50. Detector 54 is typically a CCD camera. Pinhole 53 is critical, because it gives the confocal microscope its sectioning capability. The light that passes through pinhole 53 is detected and recorded as a function of the angles of the scan mirrors over time to create an image.

A spectral dispersion device 60 as shown in FIG. 1, such as a grating, may be placed between pinhole 53 and detector 54. Using the current technology, it is therefore possible to spectrally resolve each pixel, one pixel at a time, along a raster pattern. It is understood in the art that the position of focus on the sample is directly related to the position of both scan mirrors. FIG. 1 illustrates a confocal microscope of a type similar to one manufactured by Kaiser Optical Systems, Inc., Model No. HiRes532.

U.S. Pat. No. 5,192,980 of Dixon et al. discloses a scanning optical microscope for spectrally resolving light reflected, emitted, or scattered from a sample. Dixon et al. recognizes that the diffraction limited spot at the specimen acts like the entrance aperture of an integrated monochromator. The confocal microscope of Dixon et al. therefore acts as the entrance aperture and the first collimating optic of a scanning monochromator. A diffraction grating, lens, and pinhole complete the monochromator. One obvious problem with the Dixon et al. design, and the design of other confocal microscope devices currently used in the art, is that it takes a substantial amount of time to acquire a full spectrally resolved image. For every pixel (smallest image unit at a particular resolution) of the image to be acquired, a full grating scan is required. A small (but not atypical) confocal image is on the order of 200×200, or 40,000 pixels. For example, in Dixon et al. and for other confocal microscopes in the art, building a complete spectrally resolved image requires the following summarized steps: (1) position both scan mirrors so that the scan beam focal point is on one spot (corresponding to one image pixel) of sample plane 50; (2) open the shutter attached to the CCD camera; (3) wait long enough to get the spectrum of light corresponding to that pixel; (4) close the shutter; and (5) move the scan mirrors to position the light beam on the point on the sample plane corresponding to the next image pixel and repeat process until all points of the sample plane 50 corresponding to all of the image pixels have been spectrally resolved. Even if a spectral scan of one pixel takes as little time as one second (an unusually short time for a spectral scan with the low light levels available from confocal microscopy), one small spectrally resolved image would take over 10 hours.

Figure 2:
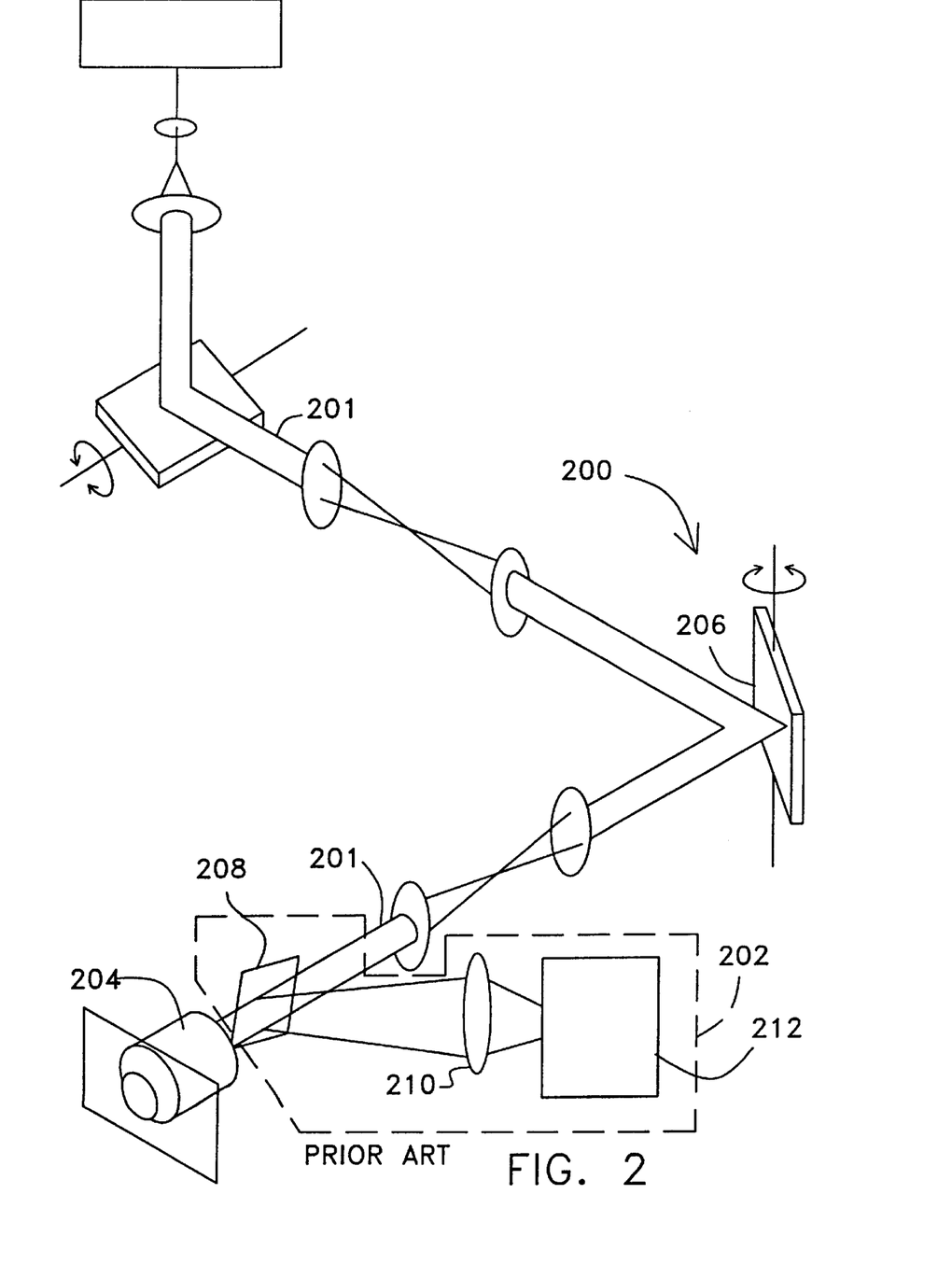
FIG. 2 is schematic diagram of a standard line scanning confocal microscope showing non-descanned detection of the prior art.

Now referring briefly to FIG. 2, which illustrates a confocal microscope arrangement also known in the art, whereby the image is non-descanned when detected. In other words, the scanned image is projected directly onto a two-dimensional detector array 212. To accomplish this, detection arm 202 is placed between microscope objective 204, and scan mirror 206, i.e., dichroic beam splitter 208 reflects fully scanned light beam 201 to lens 210, which focuses light to detector 212. Placing detection arm 202 in a position enabling it to receive the signal beam prior to its descanning has the benefit of extremely rapid image acquisition; however, sectioning capability is not possible with one photon excitation due to the absence of a pinhole to reject light originating from points not in the focal plane. Therefore, in order to retain the sectioning capability of the microscope, multi-photon excitation must be used.

U.S. Pat. No. 5,504,336 of Noguchi is a spectrofluorometric apparatus for obtaining spectral image information from a sample. However, the Noguchi invention is not used in connection with a confocal microscope or other type microscope and appears to be used in connection with laser interferometric detecting and ranging (LIDAR).

An important application of the present invention is as a detection method for DNA sequencing. A typical DNA sequencing technique generates DNA fragment strands of various lengths from a template that is the strand to be sequenced. The polymerization reactions of the fragments are terminated by the incorporation of a dideoxy analog of each of the four bases into each strand fragment thus leading to a mixture of strand fragments of all possible lengths. The strand fragment replica mixture is separated by electrophoresis along a gel microcapillary into discrete bands in accordance with strand replica molecular weight.

One way that detection and analysis of gel bands can be accomplished is by using radioisotope labeled DNA. The radioactive gel slabs containing the separated DNA fragments are exposed overnight to film. After development of the x-ray film, the sequence or size of the DNA separated fragments are read directly from the images on the film. The disadvantage of autoradiographic detection is the time required to expose and develop the film, and the use of hazardous environmentally harmful materials.

An alternative to radioisotope labeling of DNA, is fluorescently labeling the DNA. (L. M. Smith, J. Z. Sanders, R. J. Kaiser, P Hughs, C. Dodd, C. R. Connell, C. Heiner, S. B. H. Kent, and L. E. Hood, *Nature* vol. 321, pp 674–679) The present detection apparatuses and methods for detection and analysis of fluorescently labeled DNA employ a set of four filters that are selected to pass light emitting from four dyes used to label the four bases of strands of DNA. A desirable set of four dye labels should have very well separated emission spectra, but should have nearly overlapping absorption spectra so that they can all be successfully excited with the same laser line. Such criteria (non-overlapping emission spectra coupled with well-overlapped absorption spectra) are extremely difficult to achieve due to the nature of the relation between absorption and emission. This presents severe limitations on the choice of the set of dye labels. The apparatus and method of the present invention described below broadens the set of dye labels available to researchers by using other spectral characteristics, such as bandwidth and the spectral center of mass to serve as unique identifiers of spectrally overlapping dye sets.

Mathies et al. in U.S. Pat. No. 5,091,652 disclose a confocal microscope and method for detecting and analyzing fluorescently labeled DNA separated using a plurality of gel filled microcapillaries. However, the confocal microscope apparatus of Mathies et al. requires the traditional use of four dyes having well separated emission spectra, and further must read and analyze the fluorescence emitted in bands traveling within each capillary one capillary at a time.

With the foregoing in mind, it becomes a general object of the present invention to provide a scanning beam confocal microscope apparatus and method to reduce the acquisition time to spectrally resolve an entire confocal image.

It is another object of the present invention to provide a scanning beam confocal microscope apparatus and method to project light from a region of the sample plane corresponding to at least two image pixels along one axis of a two dimensional detector array, while using a spectrometer to disperse the spectra of the region's composite pixels along the other axis of the detector array.

It is yet another object of the present invention to provide an apparatus and method to reduce the acquisition time to spectrally resolve an entire confocal image using a partially point-descanned spectral imaging confocal microscope.

It is an object of the present invention to provide an apparatus and method to reduce the acquisition time to spectrally resolve a confocal image using a direct projection line-scan spectral imaging confocal microscope.

It is another object of the present invention to provide an apparatus and method for use in the rapid detection and acquisition of fluorescence emitted from fluorescent labeled samples being separated by microcapillary electrophoresis.

SUMMARY OF THE INVENTION

The apparatus and method of the present invention is a unique optical configuration of a confocal microscope, which preserves the confocal microscope's important sectioning capability while offering good spatial and spectral resolution with a greatly reduced image acquisition time over previous inventions. The present invention simultaneously detects and acquires a region of the sample plane of a sample and projects the region's image along one axis of a two-dimensional detector array while using a spectrometer to disperse the spectra of the region's composite pixels along the other axis. The sample plane of the present invention is therefore comprised of or divided into a plurality of regions, each region comprised of at least two points in the sample plane corresponding to at least two image pixels. Each region of the sample plane scanned is found along the fast axis of the scan, and is further defined as that portion of the scan that occurs between shuttering events. Each region of the sample plane scanned is projected onto the vertical entrance slit of a spectrometer and subsequently mapped onto the vertical axis of the detector array. An imaging spectrometer, such as the Holospec, f/1.8 from Kaiser Optical Systems, Inc., may be used to spectrally resolve the light emitted, reflected, or scattered from the sample. Alternatively, a Fourier transform interferometer may be used to spectrally resolve the light emitted, reflected, or scattered from the sample. An image of the entire sample falling in the sample plane is obtained by the invention once all regions are scanned, mapped, and spectrally resolved.

DETAILED DESCRIPTION OF PREFERRED EMBODIMENTS OF THE INVENTION

The apparatus and method of the present invention preserves confocal microscope sectioning capability while offering good spatial and spectral resolution with a greatly reduced acquisition time over previous inventions. In summary, the present invention simultaneously acquires light from multiple points of a region of the sample plane and projects this light along one axis of a two-dimensional detector array while using a spectrometer to disperse the spectra of the light from that region along the other axis. The spectrometer slit rejects out-of-plane fluorescence, thus preserving some of the sectioning ability of the confocal technique.

Figure 3:
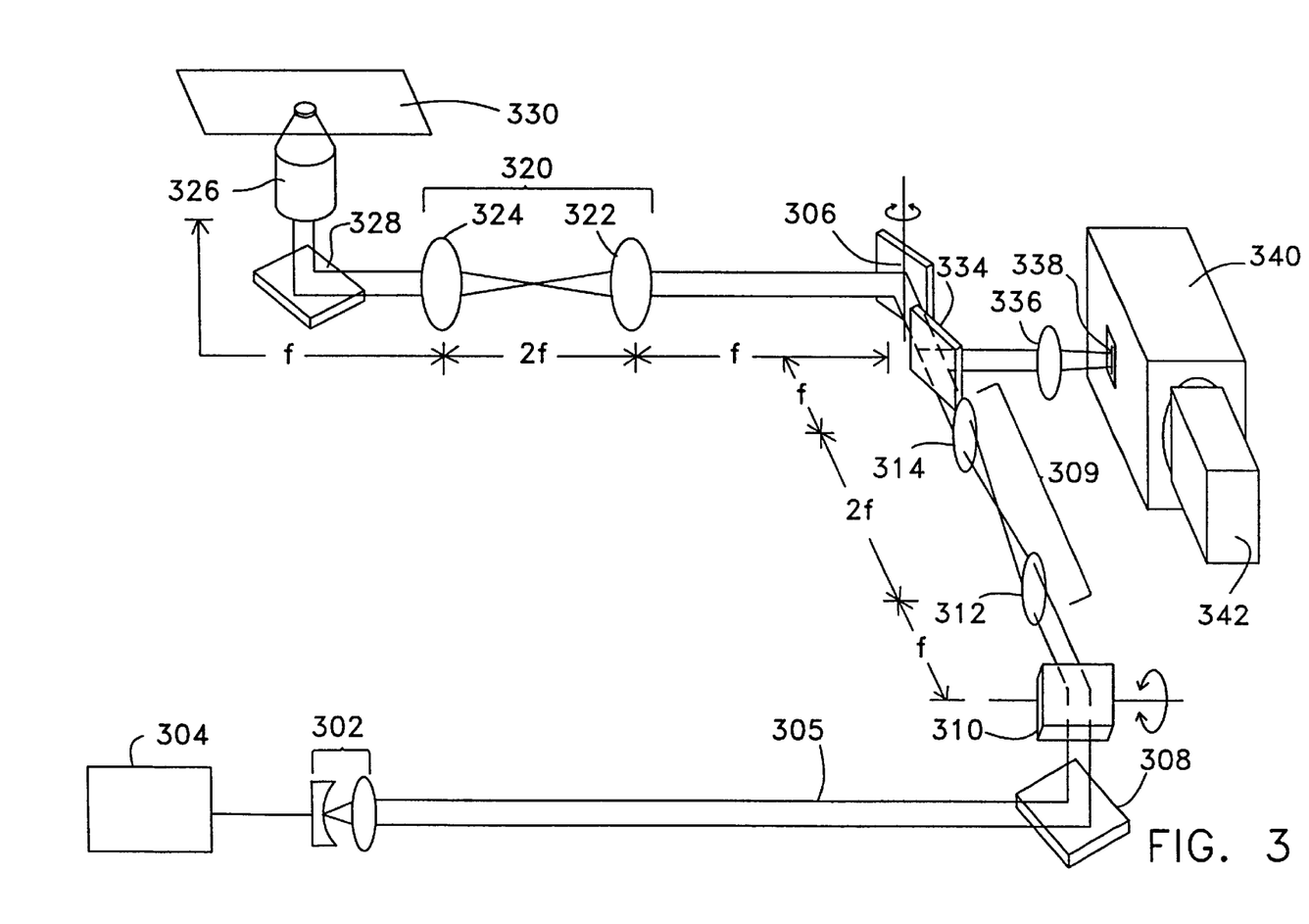
FIG. 3 is a schematic diagram of the first embodiment of the present invention, in particular, the point-focused, partially descanning confocal microscope of the present invention.
Figure 4:
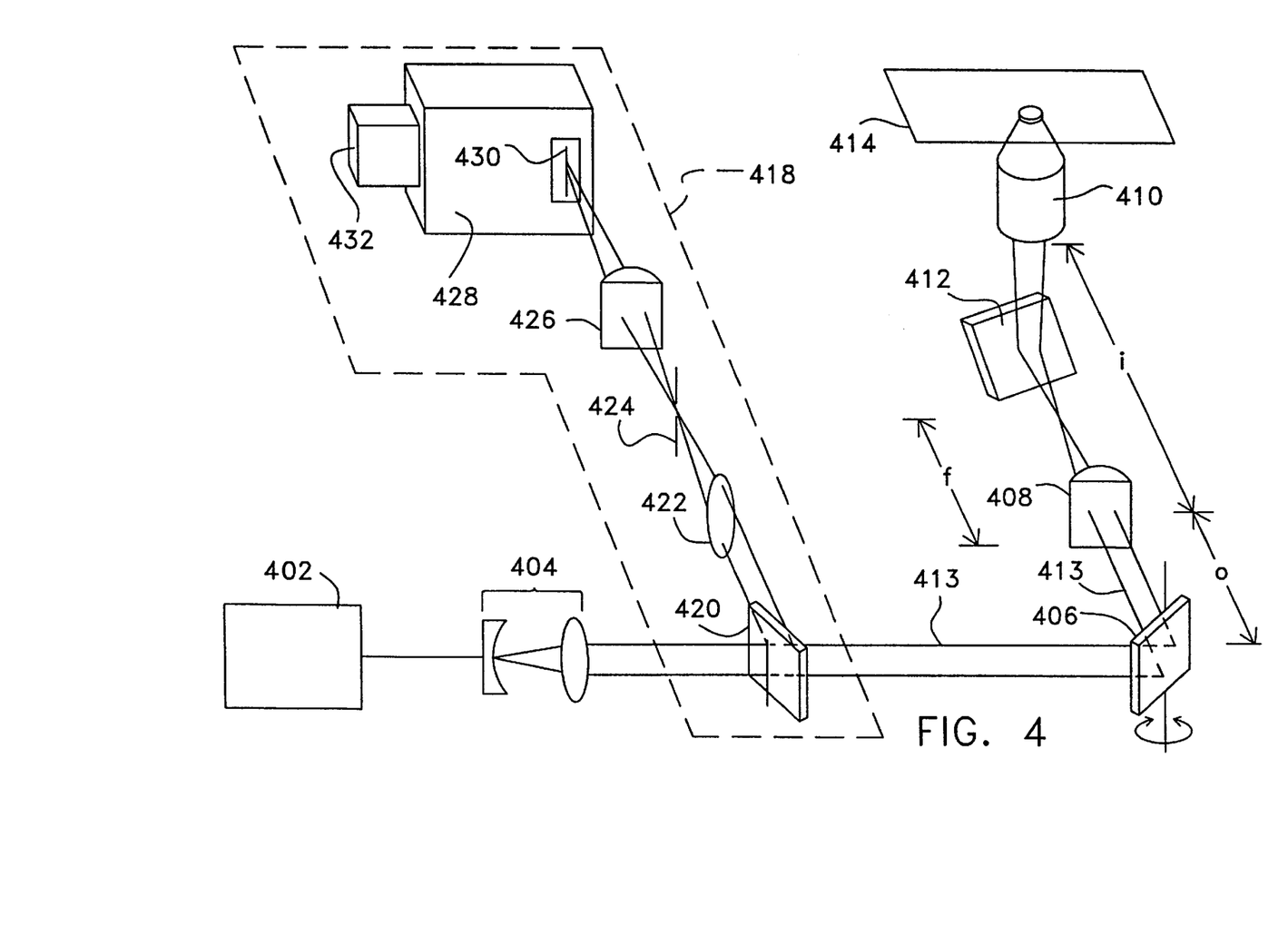
FIG. 4 is a schematic diagram of the second embodiment of the present invention, in particular, the line-scanning confocal microscope of the present invention.

A first embodiment of the invention, as illustrated in FIG. 3, uses two scan mirrors to project image regions or lines onto a spectrometer slit, which each are then spectrally dispersed and imaged onto a detector array. A second embodiment of the invention as illustrated in FIG. 4 uses one scan mirror and a cylindrical lens to similarly focus and project image regions onto a detector array. Variations of these designs, such as use of a prism spectrometer instead are possible provided they preserve the spatial information contained in the image region. In all embodiments of the present invention, light from at least two points in a region of the sample plane corresponding to at least two image pixels is projected along one axis of a two-dimensional detector array while a spectrometer disperses the spectra of light from the region's composite points along the other axis of the detector array. The beam scanning variety of the confocal microscope is critical to this instrument; a stage scanning variety is not possible.

FIG. 3 shows a point-focused, partially descanned spectral imaging confocal microscope 300 of the present invention. Beam expander 302 expands and collimates a beam of light from laser 304. Light beam 305 is then deflected vertically by a static mirror 308 and directed to first scan mirror 310, which scans light beam 305 in the vertical plane. Scan mirror 310 is driven at a high rate of speed compared to second scan mirror 306. The vertical axis is also referred to as the fast axis of the scan. In the preferred embodiment of the present invention, scan mirrors 310 and 306 are galvanomirrors Model No. 6810P, manufactured by Cambridge Technology, Inc., it being understood, of course, that any similar galvanomirror or beam deflection optic can be used. First scan mirror 310 directs light beam 305 through first unitary telescope 309 which is comprised of lenses 312 and 314, which can be replaced by elliptical or spherical mirrors for a reflective geometry. The distance between lens 312 and scan mirror 310 is f, the focal length of lens 312. In the case of the confocal microscope and optics illustrated in FIG. 3, f=10 cm. The distance between lenses 312 and 314 is 2f, twice their focal length or 20 cm. The distance between lens 314 and second scan mirror 306 is f, the focal length of lens 314. This arrangement centers the recollimated beam on second scan mirror 306. The second scan mirror 306 scans light beam 305 in the horizontal axis, at a speed slower than first scan mirror 310 scans in the vertical axis. In this example of the invention, the horizontal axis is also referred to as the slow axis.

Still referring to FIG. 3, a second unitary telescope 320 comprised of lenses 322 and 324 (lenses 322 and 324 are each of focal length f and are separated by a distance 2f), centers the recollimated light beam 305 on the entrance aperture of a high numeric aperture (NA), infinity corrected microscope objective 326. In the preferred embodiment, microscope objective 326 is a 100X oil immersion Plan-Apochromat from Carl Zeiss, Inc. Lens 322 is placed a distance f from scan mirror 306, and lens 324 is placed a distance f from the objective 326. An intermediate static mirror 328 deflects the beam vertically in order to obtain the inverted microscope geometry.

The action of scan mirrors 310, 306 results in a raster pattern scan of the now tightly focused beam across the sample plane 330 of the sample. Light reflected, emitted, or scattered from the sample is collected by the objective 326, and passed back through second unitary telescope 320, which centers the collimated fully scanned signal on second scan mirror 306. Second scan mirror 306 reflects and descans the horizontal or slow axis of the fully scanned signal, resulting in partially descanned light beam containing image information from a region of the sample containing at least two pixels. In the preferred embodiment, the region is comprised of a line of points in the sample plane (corresponding to a line of image pixels) that are illuminated by the action of the fast axis. As stated above, the number of pixels acquired between immediately consecutive shuttering events defines the region. The image line is then reflected from a dichroic beamsplitter 334, which is chosen to reflect the signal from the sample, and pass the laser light. The image line is focused by lens 336 onto entrance slit 338 of imaging spectrometer 340, such as the Holospec, f/1.8 from Kaiser Optical Systems, Inc. Lens 336 should be chosen such that f'/d matches the f number of the spectrometer, where f' is the focal length of lens 336 and d is the diameter of the entrance aperture of objective 326. This ensures maximum light throughput to detector array 342 while preserving spectral resolution. A two-dimensional detector array 342 such as the TEA/CCD 512 B from Princeton Instruments is located at the focus of spectrometer 340 as shown in FIG. 3.

Referring again to FIG. 3, spectrometer slit 338 serves the dual purpose of defracting the light for the spectrometer and rejecting out-of-plane fluorescence for sectioning. The image line is spectrally dispersed by spectrometer 340. Detector array 342 is placed at the focus of spectrometer 340. A single photo-frame of detector 342 consists of each pixel corresponding to each point in the region scanned by the fast axis mirror along the vertical axis and the light from each point in the region is spectrally resolved along the horizontal axis. Thus each readout or frame of the array contains many spectra corresponding to a region of the image. (Recall that a region is comprised of points in the sample corresponding to at least two image pixels.) Such a frame is collected for each resolvable position of the slow axis to form a complete two-spatial-dimensional image. Such an image is in fact three-dimensional where two dimensions are spatial and the third is spectral. The sectioning capability of this microscope can be taken advantage of in the usual way by adjusting the distance between the sample and the objective (Z-axis resolution). Thus, four-dimensional (three spatial, one spectral) imaging is possible. In summary, the present invention acquires at least two pixels of the image data comprising a line or region of the sample plane simultaneously and records the image of the region on a first axis of detector array 342 and spectrally resolves each pixel of the region along a second axis of detector array 342, instead of acquiring spectra pixel by pixel, as required by the apparatuses and methods currently known in the art.

FIG. 4 shows the direct projection line scanning geometry of the confocal microscope of the present invention. Detection arm 418 of FIG. 4 is similar in function to the detection arm illustrated in FIG. 3. FIG. 4 illustrates a laser 402 emitting laser light to beam expander 404 which is then incident on a galvanomirror or similar beam deflection device such as scan mirror 406 that scans light beam 413 horizontally. The scanned beam 413 passes through a cylindrical lens 408 placed a distance o from scan mirror 406. Lens 408 focuses light beam 413 to a vertical line a distance f from cylindrical lens 408, where f is the focal length of lens 408. Objective 410 is placed a distance i from cylindrical lens 408, where o and i are chosen such that 1/f=(1/o+1/i). A static mirror 412 is placed between lens 408 and objective 410 in the light beam 413 path to deflect the light beam 413 upward, allowing an inverted microscope arrangement. This optical layout results in a tightly focused line of laser light that is scanned in a direction perpendicular to this line across sample plane 414 of the sample.

Still referring to FIG. 4, detection arm 418 is comprised of dichroic beam splitter 420, lens 422, pinhole 424, and cylindrical lens 426. Spectrometer 428 is positioned after cylindrical lens 426 and includes a spectrometer slit 430 and detector 432. In operation, light from the sample is collected by objective 410 and redirected through cylindrical lens 408, which collimates it. The collimated signal is descanned by scan mirror 406 and reflected by a dichroic beamsplitter 420. The beam is then focused by lens 422 through pinhole 424, which gives the confocal microscope embodiment of the invention illustrated in FIG. 4 full sectioning capability. The light from the sample following pinhole 424 now contains image information from a region (the line referred to above) of sample plane 414. Cylindrical lens 426 focuses this image region of sample plane onto spectrometer entrance slit 430 of an imaging spectrometer 428. Detector array 432 is placed at the focus of spectrometer 428 to acquire the data. A single detection frame consists of an image region, preferably a line, along the vertical axis of detector array 432 and the dispersed spectrum of each pixel of the image region along the horizontal axis of detector array 432. A two-spatial-dimensional image is obtained by collecting a frame of data for each position of the beam deflector 406. Four-dimensional imaging (three spatial and one spectral) is possible as before. The lens and pinhole elements 422 and 424 can be removed for diminished axial resolution (sectioning ability) and improved sensitivity, although some axial resolution is retained by virtue of the spectrometer slit. Removing the lens and pinhole elements 422 and 424 would be acceptable when using multi-photon excitation, due to the sectioning ability that is already inherent in that technique. If multiphoton excitation is employed, the slit may be unnecessary for good axial resolution, although the spectral resolution would suffer.

Figure 5:
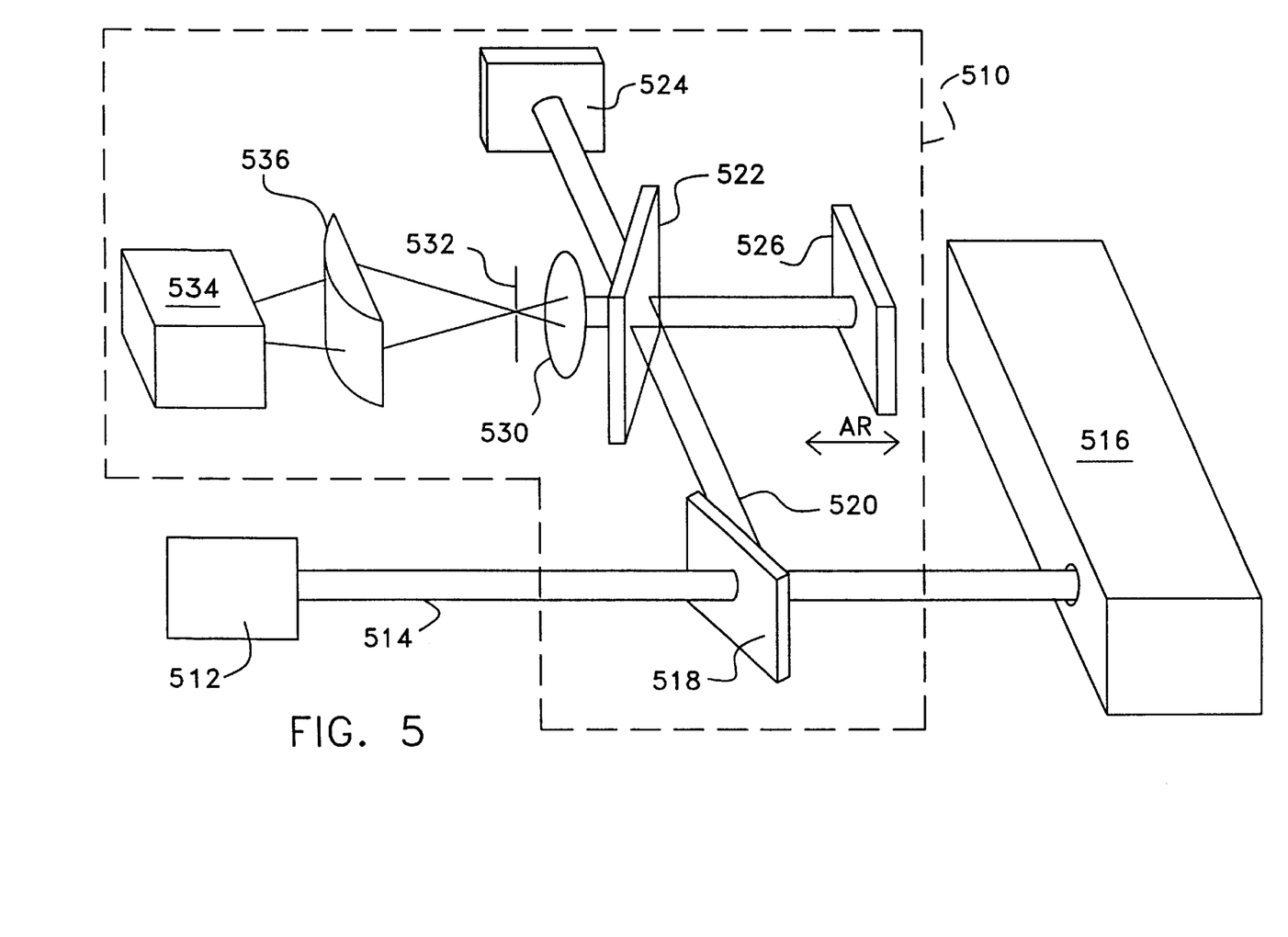
FIG. 5 is a schematic diagram of a third embodiment of the invention which is a modification of the second embodiment wherein a Fourier transform interferometer is used to spectrally resolve the fluorescence.

FIG. 5 illustrates the third embodiment of the invention showing detection arm 510 in detail for direct projection line-scanning geometry of the microscope. In this configuration, a collimated, expanded beam of light 514 from laser 512 enters microscope apparatus 516 from laser 512. Microscope apparatus 516 has an identical optical layout to that of FIG. 4. The collimated emission from the sample is reflected from a dichroic beamsplitter 518. Spectral resolution is obtained by detection arm 510 via spatially resolved Fourier transform interferometry as described below. The collimated emission 520 that is reflected from the dichroic beamsplitter 518 contains image information along its vertical axis as discussed in the description of FIG. 4. Now, however this signal beam is incident on beamsplitter 522, which passes half of the beam to a static mirror 524, and reflects half of the beam to a movable mirror 526. The mirrors 524 and 526 retroreflect the beams, directing them along paths parallel to their incoming paths back toward beamsplitter 522, where they are recombined. The recombined beam is focused by lens 530 through pinhole 532, which gives the full sectioning capability that is the attractive feature of the confocal microscope. Next, the recombined beam is focused onto a vertically oriented one-dimensional detector array 534 by cylindrical lens 536. As with the previous embodiments described above, each pixel on the one-dimensional detector array 534 is confocal to a point on the focal plane of the objective of the sample, thus an entire image line or region is detected. An interferogram is recorded for each pixel on the detector by monitoring the pattern of constructive and destructive interference of the light originating from each corresponding point in the sample. This interferogram is generated by moving mirror 526 (moving in a back and forth direction as indicated by bi-directional arrow AR), and the spectrum of each pixel is obtained by Fourier transformation of said interferogram as is known in the art. The Fourier transform interferometric detection is an attractive alternative to the dispersive techniques described previously due to its extreme sensitivity. A cylindrical lens and a slit can replace the lens and pinhole elements 530, 532 for reduced sectioning capability but increased sensitivity. Alternatively, these elements may be eliminated altogether for maximum sensitivity if sectioning ability is not required or if multi-photon excitation with its intrinsic sectioning ability is employed.

Figure 6A:
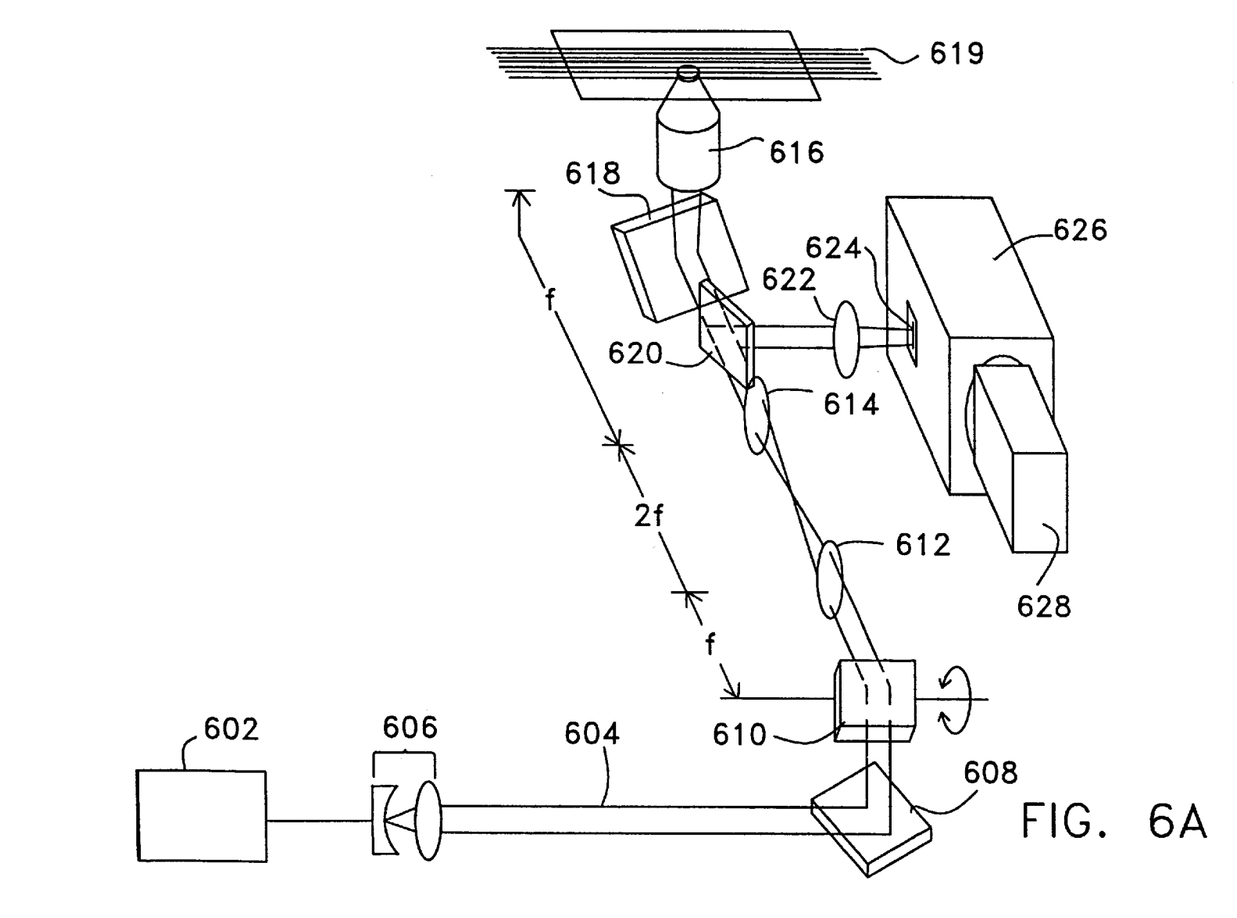
FIG. 6A is a schematic diagram illustrating the point-focused, scanning confocal microscope of the present invention applied as detection means for microcapillary electrophoretic separations.

FIG. 6A shows the point-scan spectral imaging confocal microscope of the present invention used to detect and analyze electrophoretic separation of samples simultaneously along a plurality of microcapillaries or lanes. Laser beam 604 from laser 602 is expanded by beam expander 606 and deflected vertically by a static mirror 608 to scan mirror 610 that scans the beam in the vertical plane. Lens 612 with focal length f is placed a distance f=10 cm. from scan mirror 610. Lens 614, also with focal length f, is placed a distance 2f from lens 612. The entrance aperture of an objective 616 is also placed a distance f from lens 614. Static mirror 618 is placed between lens 614 and objective 616 in order to deflect the beam upwards for an inverted microscope geometry. The action of scan mirror 610 is to scan the light beam 604 perpendicular to and across an array of microcapillary tubes 619. Fluorescence from the fluorescent labels of the sequenced fragments flowing through the microcapillaries 619 is collected and collimated by objective 616. This fluorescence is deflected by dichroic beamsplitter 620 and incident on relay lens 622. The fluorescence is focused by lens 622 to a scan line onto the slit 624 of an imaging spectrometer 626 that disperses the spectra of every point in the scan line. A two-dimensional detector array 628 is placed at the focus of the spectrometer 626. The sensitivity of this design can be improved at the cost of decreased spectral resolution by the removal of the spectrometer slit 624 because axial resolution is unimportant to this experiment.

Figure 6B:
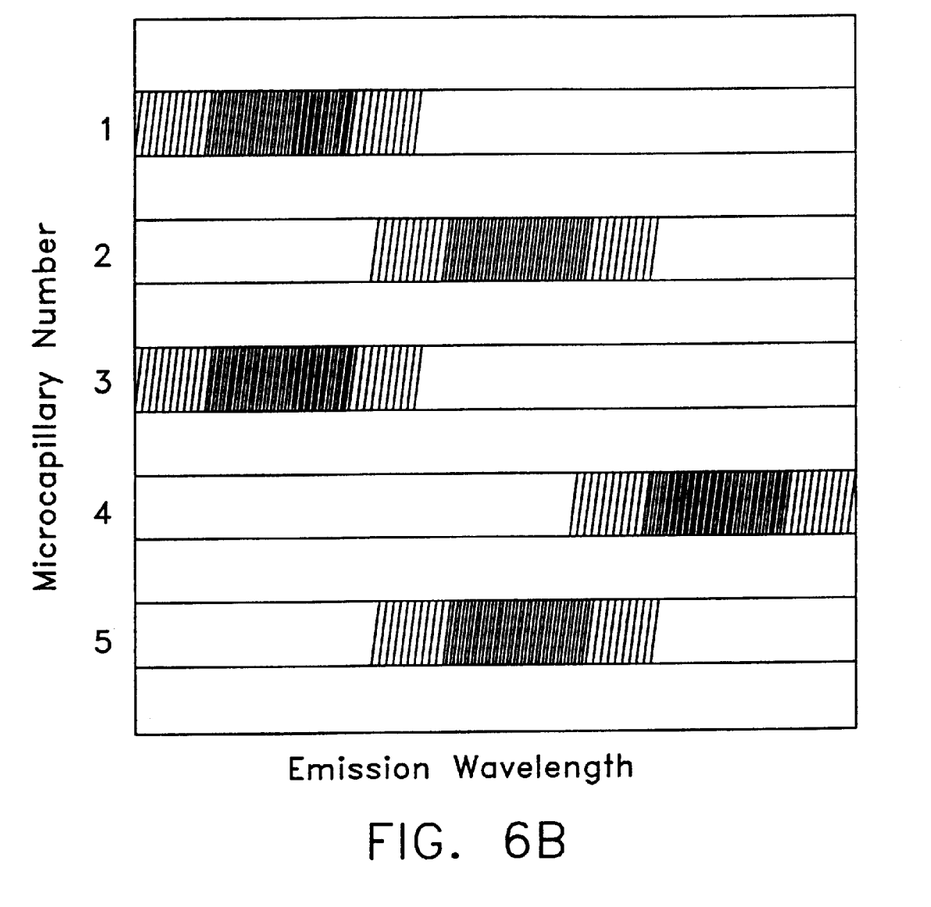
FIG. 6B is a graph illustrating a spectrally resolved line scanned across a plurality of microcapillaries to form a detected image on a detector array of the present invention.

FIG. 6B is a graphic representation of a single frame of data obtained from scanning across a plurality of microcapillaries using the confocal microscope of the present invention illustrated in FIG. 6A. The vertical axis is the microcapillary number; each of the microcapillaries detected in a scan has a corresponding spectrum that appears horizontally on the detector array. The fluorophores present in microcapillaries 1 and 3 are the same, and those in microcapillaries 2 and 5 are the same due to the identical nature of their spectra. In this example, the benefits of spectral resolution are clear. There is significant spectral overlap between the spectra of fluorophores present in microcapillaries 4 and 5. This spectral overlap may prohibit the use of these dyes in the detection methods of the prior art for microcapillary electrophoresis detection because their identities may be confused. However, the spectral resolution of the present invention allows for clear differentiation between these fluorophores based on their distinct spectra.

Figure 7:
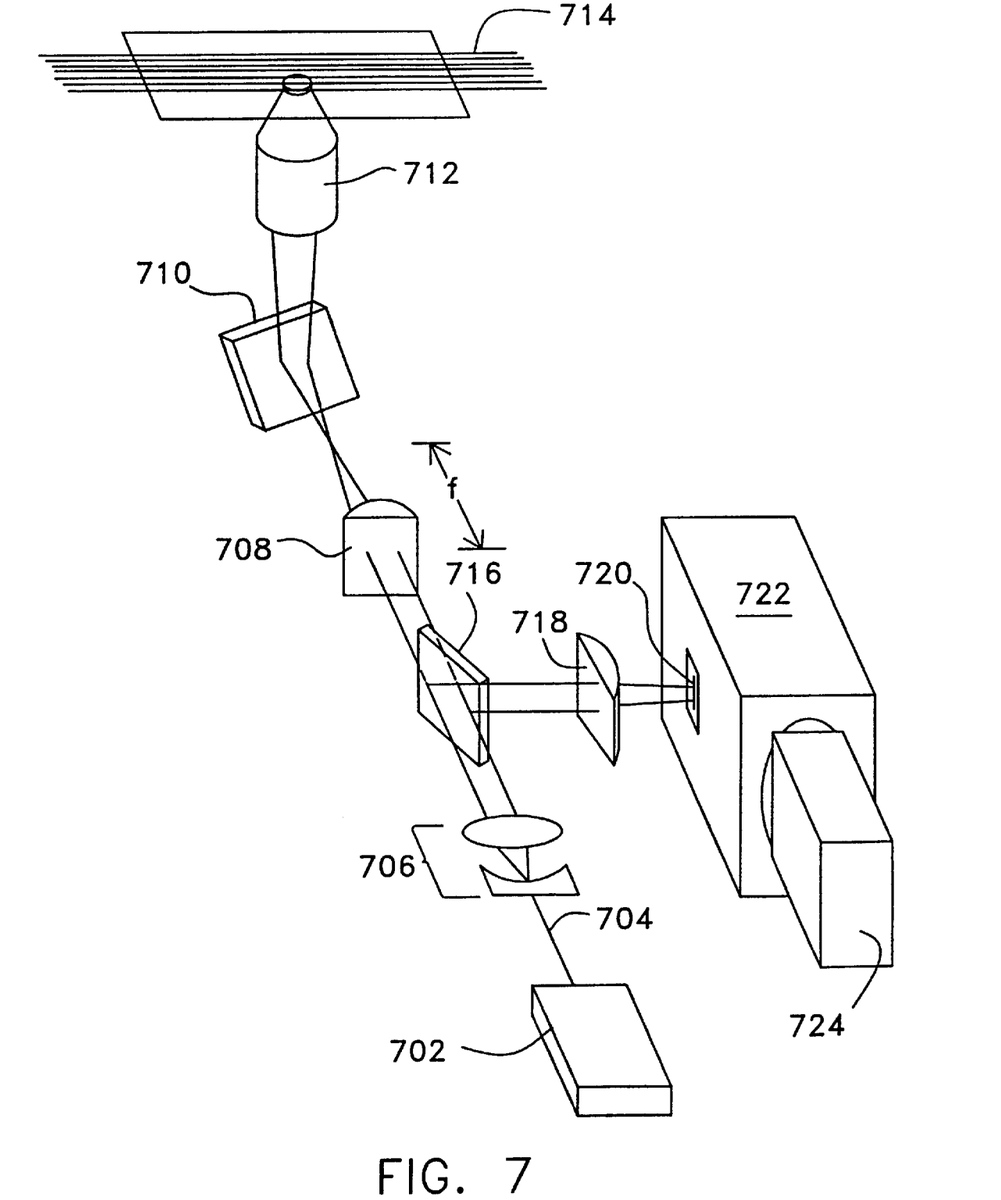
FIG. 7 is a schematic diagram illustrating the line-focused, scanning confocal microscope of the present invention applied as a detection means for microcapillary electrophoretic separations.

FIG. 7 shows the line-focus spectral imaging confocal microscope of the present invention used to detect and analyze microcapillary electrophoretic separation of samples simultaneously along a plurality of microcapillaries or lanes. Laser beam 704 from laser 702 is expanded by a beam expander 706 and is directed to cylindrical lens 708. Cylindrical lens 708 focuses beam 704 to a vertical line a distance f from lens 708, where f is the focal length of lens 708. Beam 704 is deflected vertically by a static mirror 710 into a microscope objective 712. The effect of the combined actions of the cylindrical lens 708 and the objective 712 is to tightly focus the beam into a line perpendicular to and across microcapillary array 714. Fluorescence from the fluorescent labels of the sequenced fragments flowing through microcapillaries 714 is collected by the objective 712. This fluorescence is directed back through cylindrical lens 708 and is thus collimated. The collimated fluorescence is deflected by dichroic beamspitter 716 and focused by cylindrical lens 718 onto slit 720 of imaging spectrometer 722. Spectrometer 722 disperses the spectra of every point in the line. A two-dimensional detector array 724 is placed at the focus of the spectrometer 722. A frame of data is shown in FIG. 6B as already described above. Again, sensitivity can be improved while spectral resolution sacrificed by removal of spectrometer slit 720. In an alternative detection technique, Fourier transform interferometry can also be used for spectra resolution as also discussed above.

In summary, all embodiments described above project light originating from a region of the sample plane of a sample comprised of at least two points corresponding to the same number of image pixels along one axis of a two-dimensional detector array while a spectrometer spectrally resolves the image's composite pixels along the other axis of the detector array. A region is identified as the points scanned between immediately consecutive shutter events of the detector. The significant advantage of the present invention is that an entire image is spectrally resolved in a significantly reduced amount of time compared to presently available technology. By way of further explanation, the acquisition time of a CCD camera can be represented by the equation $t_{acq.} = t_{exp.} + t_{readout} + t_{shutter}$, where $t_{exp.}$ is the exposure time (the time the signal is incident on the detector array), $t_{readout}$ is the time to digitize and store the data, and $t_{shutter}$ is the time required to open and close the shutter. The quantities $t_{exp.}$ and $t_{readout}$ are the same in the present invention as they are for the confocal microscopes currently known in the art, but $t_{shutter}$ is significantly different. For example, if an image were comprised of 40,000 pixel (200×200 pixels), currently known spectrally resolving confocal microscopes would require 40,000 shuttering events ($t_{shutter}$) to create a spectrally resolved image. However, in significant contrast, $t_{shutter}$ for the present invention would only require 200 shuttering events (200 times smaller) to create the same spectrally resolved image. The advantage of the present invention is the significant reduction of shuttering events, which reduces shuttering time such that the image acquisition time is significantly reduced. The method and apparatus of the present invention may be used to rapidly obtain images of numerous different sample types, including but not limited to biomolecules, DNA, cellular systems, isolated cells, organelles, antibodies and other proteins, encapsulated molecules, biochips, polymers, ligand crystals, solgels, and electrophoretic gels.

While the invention has thus been described with reference to specific embodiments thereof, it will be appreciated that numerous variations, modifications, and embodiments are possible, and accordingly, all such variations, modifications, and embodiments are to be regarded as being within the spirit of the invention.

What is claimed is:

1. A confocal scanning beam microscope, comprising:
   a) means for supporting a sample to be observed and measured;
   b) an illumination source producing a light beam along a path toward said sample;
   c) means for focusing the light beam on a prescribed sample plane of a sample;
   d) means for scanning the light beam in a predetermined scan pattern on said sample plane;
   e) means for simultaneously acquiring at least two points of said predetermined scan pattern on the sample plane, wherein said points include a region of the sample represented by at least two image pixels;
   f) a detection arm placed in the path of light reflected, scattered, or emitted from said region on said sample plane of said sample, comprising means for resolving the spectra of said light from each said region including a light receiving opening, and a detector array placed behind said means for spectrally resolving said region;

g) means for focusing the light from said region reflected, scattered, or emitted from said sample plane of said sample to said light receiving opening of said means for resolving the spectra of the light from said region; and h) wherein said detector array comprises means for detecting the image of said region and means for simultaneously detecting the spectra of said light of said region.

2. A confocal scanning beam microscope as recited in claim 1, further comprising means for descanning light reflected, scattered, or emitted from at least one region of said sample plane.

3. A confocal scanning beam microscope as recited in claim 2, wherein said detection arm further comprising means for resolving the spectra of said descanned light from each said region.

4. A confocal scanning beam microscope as recited in claim 3, further comprising means for focusing said region to said light receiving opening of means for resolving the spectra of said descanned light from each said region.

5. A confocal scanning beam microscope as recited in claim 4, wherein said detector array comprises means for detecting the image of said region and means for simultaneously detecting the spectra of said descanned light of said region.

6. A confocal scanning beam microscope as recited in claim 1, wherein said confocal microscope is of the point-scanning type.

7. A confocal scanning beam microscope as recited in claim 1, wherein said confocal microscope if of the line-scanning type.

8. A confocal scanning beam microscope as recited in claim 1, wherein said means for scanning the light beam in a predetermined scan pattern on said sample plane further comprises a first scan mirror scanning said light beam in a first axis and directing said light beam to a second scan mirror, wherein said second scan mirror scanning said light beam in a second axis to form a raster pattern on said sample plane of the sample and partially descanning the light reflected, scattered, or emitted from at least one region of said sample plane.

9. A confocal scanning beam microscope as recited in claim 8, wherein said detection arm is located for receiving said partially descanned light and focusing it upon said light receiving opening.

10. A confocal scanning beam microscope as recited in claim 9, wherein said first scan mirror scans fast along said first axis and said second scan mirror scans slow along said second axis such that said first axis is projected onto said light receiving opening.

11. A confocal scanning beam microscope as recited in claim 10, said detection arm further comprising a two dimensional detector having first and second axes, wherein said image of said region is recorded on said first axis of said detector and said spectral resolution is simultaneously recorded on said second axis of said detector.

12. A confocal scanning beam microscope as recited in claim 1, wherein a plurality of microcapillaries contain said samples arranged in a coplanar parallel array located within said sample plane.

13. A confocal scanning beam microscope as recited in claim 1, wherein a solgel contains said samples located within said sample plane.

14. A confocal scanning beam microscope as recited in claim 1, wherein an electrophoretic gel contains said samples located within said sample plane.

15. A confocal scanning beam microscope as recited in claim 1, wherein said sample to be observed is comprised of fluorescent samples located within said sample plane.

16. A confocal scanning beam microscope as recited in claim 1, wherein said sample to be observed is comprised of biomolecules.

17. A confocal scanning beam microscope as recited in claim 1, wherein said sample to be observed is comprised of DNA.

18. A confocal scanning beam microscope as recited in claim 1, wherein said sample to be observed is comprised of a cellular system.

19. A confocal scanning beam microscope as recited in claim 1, wherein said sample to be observed is comprised of isolated cells.

20. A confocal scanning beam microscope as recited in claim 1, wherein said sample to be observed is comprised of organelles.

21. A confocal scanning beam microscope as recited in claim 1, wherein said sample to be observed is comprised of antibodies.

22. A confocal scanning beam microscope as recited in claim 1, wherein said sample to be observed is comprised of encapsulated molecules.

23. A confocal scanning beam microscope as recited in claim 1, wherein said sample to be observed is comprised of biochips.

24. A confocal scanning beam microscope as recited in claim 1, wherein said sample to be observed is comprised of polymers.

25. A confocal scanning beam microscope as recited in claim 1, wherein said sample to be observed is comprised ligand crystals.

26. A confocal scanning beam microscope as recited in claim 1, wherein said light receiving opening of said means for spectrally resolving each said region is formed as a slit.

27. A method for rapid acquisition of spectrally resolved confocal images comprising:

a) supporting a sample to be observed and measured;

b) transmitting a light beam along a path toward said sample;

c) focusing the light beam on a prescribed sample plane of a sample;

d) scanning the light beam in a predetermined scan pattern on said sample plane;

e) acquiring simultaneously at least two points of said predetermined predetermined scan pattern on the sample plane, wherein said points include a region of the sample represented by at least two image pixels;

f) focusing said region to said light receiving opening of means for resolving the spectra of the light from each said region; and g) recording simultaneously the image of said region along one axis of a detector and spectral resolution of the image of said region along a second axis of said detector.

28. A method for rapid acquisition of spectrally resolved confocal images as recited in claim 27 further comprising:

a) descanning light reflected, scattered, or emitted from at least one region of said sample plane;

b) resolving the spectral of said descanned light from each said region;

c) focusing said region to said light receiving opening of means for resolving the spectra of said descanned light from each said region;

d) recording said image of each said region on the first axis of said detector; and e) recording, simultaneous with recording said image of said region on the first axis of said detector, the spectral resolution of said image of said region on the second axis of said detector.

29. A confocal scanning beam microscope for scanning a gel to detect fluorescence from fluorescence labeled separated samples contained in a plurality of microcapillaries, comprising:

a) means for supporting said samples to be observed and measured;

b) an illumination source producing a light beam along a path toward said sample;

c) means for focusing the light beam on a prescribed sample plane of said samples, wherein said samples are separated in a plurality of microcapillaries arranged in a coplanar parallel array located within said sample plane;

d) means for scanning the light beam in a predetermined scan pattern on said sample plane;

e) means for simultaneously acquiring a line of points of said predetermined scan pattern on the sample plane, wherein said line of points run perpendicular to and across said plurality of microcapillaries;

f) a detection arm placed in the path of light reflected, scattered, or emitted from said line of points on said sample plane of said samples, comprising means for resolving the spectra of said line of points including a light receiving opening, and a detector array placed behind said means for spectrally resolving said line of points;

g) means for focusing the light from said line of points reflected, scattered, or emitted from said sample plane of said samples to said light receiving opening of means for resolving the spectra of the light from each said region; and h) wherein said detector arm comprises means for detecting the image of said line of points and means for simultaneously detecting the spectra of said light of said line of points.

30. A confocal scanning beam microscope for scanning a gel to detect fluorescence from fluorescently labeled separated samples contained in a plurality of microcapillaries as recited in claim 29, further comprising means for descanning light reflected, scattered, or emitted from said line of points of said sample plane.

31. A confocal scanning beam microscope for scanning a gel to detect fluorescence from fluorescently labeled separated samples contained in a plurality of microcapillaries as recited in claim 30, wherein said detection arm further comprising means for resolving the spectra of said descanned light from said line of points of said sample plane.

32. A confocal scanning beam microscope for scanning a gel to detect fluorescence from fluorescently labeled separated samples contained in a plurality of microcapillaries as recited in claim 31, further comprising means for focusing said region to said light receiving opening of means for resolving the spectra of said descanned light from said line of points of said sample plane.

33. A confocal scanning beam microscope for scanning a gel to detect fluorescence from fluorescently labeled separated samples contained in a plurality of microcapillaries as recited in claim 32, wherein said detector array comprises means for detecting the image of said line of points and means for simultaneously detecting the spectra of said descanned light of said line of points.

34. A confocal scanning beam microscope for scanning a gel to detect fluorescence from fluorescently labeled separated samples contained in a plurality of microcapillaries as recited in claim 29, wherein said confocal microscope is of the point-scanning type.

35. A confocal scanning beam microscope for scanning a gel to detect fluorescence from fluorescently labeled separated samples contained in a plurality of microcapillaries as recited in claim 29, wherein said confocal microscope is of the line-scanning type.

36. A confocal scanning beam microscope for scanning a gel to detect fluorescence from fluorescently labeled separated samples contained in a plurality of microcapillaries as recited in claim 29, wherein said means for scanning the light beam in a predetermined scan pattern on said sample plane further comprises a first scan mirror scanning said light beam in a first axis and directing said light beam to a second scan mirror, wherein said second scan mirror scanning said light beam in a second axis to form a raster pattern on said sample plane of the sample and partially descanning the light reflected, scattered, or emitted from at least one line of points of said sample plane.

37. A confocal scanning beam microscope for scanning a gel to detect fluorescence from fluorescently labeled separated samples contained in a plurality of microcapillaries as recited in claim 29, wherein said detection arm is located for receiving said partially descanned light and focusing it upon said light receiving opening.

38. A confocal scanning beam microscope for scanning a gel to detect fluorescence from fluorescently labeled separated samples contained in a plurality of microcapillaries as recited in claim 36, wherein said first scan mirror scans fast along said first axis and said second scan mirror scans slow along said second axis such that said first axis is projected onto said light receiving opening.

39. A confocal scanning beam microscope for scanning a gel to detect fluorescence from fluorescently labeled separated samples contained in a plurality of microcapillaries as recited in claim 31, said detection arm further comprising a two dimensional detector having first and second axes, wherein said image of said line of points of said sample plane is recorded on said first axis of said detector and said spectral resolution is simultaneously recorded on said second axis of said detector.

* * * * *

UNITED STATES PATENT AND TRADEMARK OFFICE
CERTIFICATE OF CORRECTION

PATENT NO. : 6,134,002
DATED : October 17, 2000
INVENTOR(S) : Michael J. Stimson and John D. Simon It is certified that error appears in the above-identified patent and that said Letters Patent are hereby corrected as shown below:

Line 11 of Claim 27, delete "predetermined", first appearance. (Applicant error)

Signed and Sealed this

Eighth Day of May, 2001

Attest:

NICHOLAS P. GODICI

Attesting Officer

Acting Director of the United States Patent and Trademark Office